US011883345B2

(12) United States Patent
Marcel et al.

(10) Patent No.: US 11,883,345 B2
(45) Date of Patent: Jan. 30, 2024

(54) MEDICAL STABILIZER HARNESS METHOD AND APPARATUS

(71) Applicant: Airborne Motors, LLC, The Woodlands, TX (US)

(72) Inventors: Jesse Antoine Marcel, Veradale, WA (US); Jeffrey Scott Chimenti, The Woodlands, TX (US)

(73) Assignee: Airborne Motors, LLC, The Woodlands, TX (US)

( * ) Notice: Subject to any disclaimer, the term of this patent is extended or adjusted under 35 U.S.C. 154(b) by 629 days.

(21) Appl. No.: 16/748,779

(22) Filed: Jan. 21, 2020

(65) Prior Publication Data
US 2020/0230013 A1     Jul. 23, 2020

Related U.S. Application Data

(60) Provisional application No. 62/794,639, filed on Jan. 20, 2019.

(51) Int. Cl.
*A61H 3/00* (2006.01)

(52) U.S. Cl.
CPC ......... *A61H 3/00* (2013.01); *A61H 2003/007* (2013.01); *A61H 2201/1215* (2013.01); *A61H 2201/163* (2013.01); *A61H 2201/1638* (2013.01); *A61H 2201/1642* (2013.01); *A61H 2201/1652* (2013.01); *A61H 2201/5064* (2013.01)

(58) Field of Classification Search
CPC ................ A61H 3/00; A61H 2003/007; A61H 2201/1215; A61H 2201/163; A61H 2201/1638; A61H 2201/1642; A61H 2201/1652; A61H 2201/5064
See application file for complete search history.

(56) References Cited

U.S. PATENT DOCUMENTS 2,279,690 A    4/1942  Lindsey
3,033,492 A    5/1962  Rowe
(Continued)

FOREIGN PATENT DOCUMENTS

CN    102166928       8/2011
CN    202326019 U     7/2012
(Continued)

OTHER PUBLICATIONS

Extended European Search Report dated Nov. 25, 2021, in European Patent Application No. 19774564.9, 11 pages.
(Continued)

*Primary Examiner* — Timothy A Stanis
(74) *Attorney, Agent, or Firm* — Lowe Graham Jones PLLC

(57) ABSTRACT

A stabilizing medical belt or harness method and apparatus for averting injury in individuals that are prone to falls is configured to be worn by the user as a belt or harness and operated autonomously. Power is preferably provided by a battery pack located on the belt or harness. The invention includes a plurality of gyroscopic drives that produce a strong stabilizing effect when activated by a central computer that detects when the user is about to slip or fall. The medical stabilizer belt or harness will also aid patients in physical therapy by assisting in balance during recovery.

4 Claims, 12 Drawing Sheets

(56) References Cited

U.S. PATENT DOCUMENTS

| | | |
|---|---|---|
| 3,142,455 A | 7/1964 | Wilford |
| 3,265,329 A | 8/1966 | Postelson |
| 3,327,538 A | 6/1967 | Krupick et al. |
| 3,396,391 A | 8/1968 | Anderson et al. |
| 3,845,995 A | 11/1974 | Wehde |
| 3,972,490 A | 8/1976 | Zimmermann et al. |
| 3,991,487 A | 11/1976 | Bede |
| 4,046,335 A | 9/1977 | Osberger |
| 4,459,087 A | 7/1984 | Barge |
| 4,720,640 A | 1/1988 | Anderson et al. |
| 4,953,811 A | 9/1990 | Smith |
| 5,331,245 A | 7/1994 | Burgbacher et al. |
| 5,454,531 A | 10/1995 | Melkuti |
| 5,514,923 A | 5/1996 | Gossler et al. |
| 5,601,346 A | 2/1997 | Lustenberger et al. |
| 5,786,645 A | 7/1998 | Obidniak |
| 5,925,952 A | 7/1999 | Bichler et al. |
| 6,270,038 B1 | 8/2001 | Cycon et al. |
| 6,431,494 B1 | 8/2002 | Kinkead et al. |
| 6,465,902 B1 | 10/2002 | Beauchamp et al. |
| 6,919,663 B2 | 7/2005 | Iles-Klumpner |
| 6,921,042 B1 | 7/2005 | Goodzeit et al. |
| 7,032,861 B2 | 4/2006 | Sanders, Jr. et al. |
| 7,109,671 B2 | 9/2006 | Bedini |
| 7,148,596 B2 | 12/2006 | Minato et al. |
| 7,152,301 B2 | 12/2006 | Rittmeyer |
| 7,825,554 B2 | 11/2010 | Bastian, II et al. |
| 7,874,513 B1 | 1/2011 | Smith |
| 8,083,557 B2 | 12/2011 | Sullivan |
| 8,698,365 B2 | 4/2014 | Hull et al. |
| 8,752,787 B2 | 6/2014 | Ruan et al. |
| 8,761,961 B2 | 6/2014 | Lee et al. |
| 9,649,242 B2 | 5/2017 | Chiu et al. |
| 10,040,544 B2 | 8/2018 | Marcel |
| 10,084,365 B1 | 9/2018 | Pandya |
| 10,144,507 B2 | 12/2018 | Chretien |
| 10,432,079 B2 | 10/2019 | Ny |
| 10,473,107 B1 | 11/2019 | Newton et al. |
| 10,523,074 B2 | 12/2019 | Linares |
| 10,676,180 B2 | 6/2020 | Marcel |
| 2003/0085319 A1 | 5/2003 | Wagner et al. |
| 2004/0020185 A1 | 2/2004 | Brouillette et al. |
| 2004/0061022 A1 | 4/2004 | Paul |
| 2004/0094662 A1 | 5/2004 | Sanders, Jr. et al. |
| 2005/0188701 A1 | 9/2005 | Kung et al. |
| 2005/0269889 A1 | 12/2005 | Tessier et al. |
| 2006/0001629 A1 | 1/2006 | Obinata |
| 2006/0016929 A1 | 1/2006 | Mohr |
| 2006/0038461 A1 | 2/2006 | Gabrys |
| 2006/0049304 A1 | 3/2006 | Sanders, Jr. et al. |
| 2006/0070646 A1* | 4/2006 | Denman .................. A45F 3/14 |
| | | 135/66 |
| 2007/0188906 A1 | 8/2007 | Ho et al. |
| 2007/0210730 A1 | 9/2007 | Lee |
| 2008/0042504 A1 | 2/2008 | Thibodeau et al. |
| 2008/0223979 A1 | 9/2008 | Schlunke |
| 2010/0001143 A1 | 1/2010 | Bojiuc |
| 2010/0084938 A1 | 4/2010 | Palmer et al. |
| 2010/0090440 A1 | 4/2010 | Reichstetter et al. |
| 2010/0307290 A1 | 12/2010 | Porfiropoulos |
| 2011/0178711 A1 | 7/2011 | Christoph |
| 2011/0285141 A1 | 11/2011 | Groendahl et al. |
| 2011/0291513 A1 | 12/2011 | Schaefer |
| 2012/0056040 A1 | 3/2012 | Brotherton-Ratcliffe et al. |
| 2012/0091832 A1 | 4/2012 | Soderberg |
| 2012/0104155 A1 | 5/2012 | Yarger |
| 2012/0112461 A1 | 5/2012 | Saluccio |
| 2013/0020429 A1 | 1/2013 | Kroo |
| 2013/0093295 A1 | 4/2013 | Rabal |
| 2013/0251525 A1 | 9/2013 | Saiz |
| 2014/0049218 A1 | 2/2014 | Morand et al. |
| 2014/0180184 A1 | 6/2014 | Duguid |
| 2014/0260714 A1* | 9/2014 | Vallery .................. G01C 19/04 |
| | | 74/5.37 |
| 2015/0149000 A1 | 5/2015 | Rischmuller et al. |
| 2015/0188400 A1 | 7/2015 | Kemp et al. |
| 2015/0209212 A1 | 7/2015 | Duguid |
| 2015/0226086 A1 | 8/2015 | Samuelson |
| 2016/0008206 A1 | 1/2016 | Devanaboyina |
| 2016/0017618 A1 | 1/2016 | White et al. |
| 2016/0049854 A1 | 2/2016 | Ny |
| 2016/0152327 A1 | 6/2016 | Bertels |
| 2016/0207625 A1 | 7/2016 | Judas et al. |
| 2017/0073065 A1 | 3/2017 | Von Novak et al. |
| 2017/0104385 A1 | 4/2017 | Salamon et al. |
| 2017/0320598 A1 | 11/2017 | Bushroe |
| 2017/0335821 A1 | 11/2017 | Ohya et al. |
| 2017/0361930 A1 | 12/2017 | Choi et al. |
| 2018/0034353 A1 | 2/2018 | Gieras et al. |
| 2018/0112675 A1 | 4/2018 | Neff et al. |
| 2018/0166945 A1 | 6/2018 | Colavincenzo et al. |
| 2018/0205279 A1 | 7/2018 | Linares |
| 2018/0257793 A1* | 9/2018 | Ehinger .................. B64G 1/285 |
| 2019/0300165 A1 | 10/2019 | Marcel et al. |
| 2019/0309961 A1 | 10/2019 | Suarez et al. |
| 2020/0140102 A1 | 5/2020 | Marcel et al. |
| 2022/0063820 A1 | 3/2022 | Uruma et al. |

FOREIGN PATENT DOCUMENTS

| | | |
|---|---|---|
| CN | 104980001 | 10/2015 |
| CN | 205372860 U | 7/2016 |
| CN | 106516127 | 3/2017 |
| CN | 111023462 | 4/2020 |
| DE | 19842543 | 5/1999 |
| EP | 2319796 | 5/2011 |
| EP | 2514400 | 10/2012 |
| EP | 2594477 | 5/2013 |
| EP | 2610176 | 7/2013 |
| EP | 2896933 | 7/2015 |
| EP | 3296199 | 3/2018 |
| JP | 3029792 | 2/2000 |
| JP | 2006-021552 | 1/2006 |
| JP | 2009-544265 | 12/2009 |
| JP | 2010-088271 | 4/2010 |
| JP | 2013-505697 | 2/2013 |
| JP | 2013-139247 | 7/2013 |
| RU | 2321765 | 4/2008 |
| RU | 2333866 C2 | 9/2008 |
| RU | 2009134950 A | 3/2011 |
| RU | 109740 U1 | 10/2011 |
| RU | 112152 U1 | 1/2012 |
| RU | 2527248 | 8/2014 |
| RU | 2538737 | 1/2015 |
| SU | 1211449 | 2/1986 |
| WO | 2008/006614 | 1/2008 |
| WO | 2009/093181 | 7/2009 |
| WO | 2011/034336 | 3/2011 |
| WO | 2013098736 | 7/2013 |
| WO | 2016/153580 | 9/2016 |
| WO | 2016195491 | 12/2016 |
| WO | 2017/030509 | 2/2017 |
| WO | 2019/086293 | 5/2019 |
| WO | 2020023977 | 1/2020 |

OTHER PUBLICATIONS

International Search Report and Written Opinion of the International Searching Authority completed Dec. 17, 2021, in International Patent Application No. PCT/US21/54041, 6 pages.

International Search Report and Written Opinion of the International Searching Authority dated Jun. 10, 2021, in International Patent Application No. PCT/US21/20174, 8 pages.

International Search Report and Written Opinion of the International Searching Authority completed Aug. 28, 2016, in International Patent Application No. PCT/US16/12073, 12 pages.

International Search Report and Written Opinion of the International Searching Authority completed Jul. 12, 2019, in International Patent Application No. PCT/US19/24696, 6 pages.

International Search Report and Written Opinion of the International Searching Authority completed Oct. 30, 2019, in International Patent Application No. PCT/US19/43995, 6 pages.

(56) References Cited

OTHER PUBLICATIONS

International Search Report and Written Opinion of the International Searching Authority completed May 12, 2020, in International Patent Application No. PCT/US2019/048191, 7 pages.
International Search Report and Written Opinion of the International Searching Authority completed Jun. 8, 2020, in International Patent Application No. PCT/US20/23676, 9 pages.
International Preliminary Report on Patentability dated Oct. 8, 2020, in International Patent Application No. PCT/US19/24696, 6 pages.
International Search Report and Written Opinion of the International Searching Authority completed Apr. 17, 2020, in International Patent Application No. PCT/US2020/014491, 7 pages.
International Search Report and Written Opinion of the International Searching Authority completed Oct. 12, 2022, in International Patent Application No. PCT/US22/37944, 6 pages.
Extended European Search Report dated Mar. 25, 2022, in European Patent Application No. 19840606.8, 12 pages.
Extended European Search Report dated Apr. 22, 2022, in European Patent Application No. 19875012.7, 9 pages.
Extended European Search Report dated Oct. 26, 2022, in European Patent Application No. 20773559.8, 6 pages.
Extended European Search Report dated Sep. 23, 2022, in European Patent Application No. 20741708.0, 10 pages.

* cited by examiner

MEDICAL STABILIZER HARNESS METHOD AND APPARATUS

PRIORITY CLAIM

This application claims the benefit of U.S. Provisional Patent Application No. 62/794,639, filed Jan. 20, 2019, the contents of which are incorporated herein by reference in their entirety.

FIELD OF THE INVENTION

The invention relates to the field of medical devices used to assist impaired individuals to locomote safely. More specifically, the invention comprises self-driven gyroscopes to minimize fall injuries in geriatric individuals and/or assist with physical therapy.

BACKGROUND OF THE INVENTION

There are many known devices to assist geriatric individuals to locomote and prevent falls. Most of these are in the form of walkers and canes. One good example is the rollator consisting of a walking frame with wheels, especially one designed for disabled or elderly. While aiding in locomotion and assisting with balance, they do little when the user stumbles or falls. One in four Americans aged 65+ will still fall each year with an older adult dying in a hospital room from a fall every 19 minutes. The present invention seeks to lower injuries/deaths and associated costs.

SUMMARY OF THE INVENTION

The present invention comprises a medical stabilizer used to minimize injury in falls and to assist in physical therapy. The invention is configured to be worn by the user. Power for the drive is preferably powered by a battery near or on the user.

The invention includes a plurality of motors that create a strong gyroscopic stabilizing effect. The drives are integrated into a belt or harness and aligned in such a manner that if the person wearing the invention was to start to fall, they would resume a stable standing position rather than falling in any of 360 degrees.

Control features are preferably provided as either simply on or off as well as autonomously through a system of electronics that detect an oncoming fall that will activate the device. Power is supplied by a battery or external power.

BRIEF DESCRIPTION OF THE DRAWINGS

Preferred and alternative examples of the present invention are described in detail below with reference to the following drawings.

DETAILED DESCRIPTION OF THE PREFERRED EMBODIMENT

The terminology used herein is for describing particular embodiments only and is not intended to be limiting for the invention. As used herein, the term "and/or" includes any and all combinations of one or more of the associated listed items. As used herein, the singular forms "a," "an" and "the" are intended to include the plural forms as well as the singular forms, unless the context clearly indicates otherwise. It will be further understood that the terms "comprises" and/or "comprising" when used in this specification, specify the presence of stated features, steps, operations, elements, and/or components, but do not preclude the addition of one or more other features, steps, operations, elements, components, and/or groups thereof.

Unless otherwise defined, all terms used herein, including technical and scientific terms, used herein have the same meaning as commonly understood by one having ordinary skill in the art to which the invention belongs. It will be further understood that terms, such as those defined in commonly used dictionaries, should be interpreted as having a meaning that is consistent with their meaning in the one context of the relevant art and the present disclosure and will not be interpreted in an idealized or overly formal sense unless expressly so defined, herein.

In describing the invention, it will be understood that several techniques and steps are disclosed. Each of these has individual benefit and each can also be used in conjunction with one or more (or in some cases all) of the other disclosed techniques. Accordingly, for the sake of clarity, this description will refrain from repeating every possible combination of the individual steps in an unnecessary fashion. Nevertheless, the specification and claims should be read with the understanding that such combination are entirely within the scope of the invention and the claims.

New stabilizing belt or harness method and apparatus for controlling falls and assist with physical therapy in a wearable clothing accessory are discussed herein. In the following description, for the purposes of explanation, numerous specific details are set forth in order to provide a thorough understanding of the present invention. It will be evident, however, to one skilled in the art that the present invention may be practiced without these specific details.

The present disclosure is to be considered as an exemplification of the invention and is not intended to limit the invention to the specific embodiments illustrated by the figures or description below.

Figure 1:
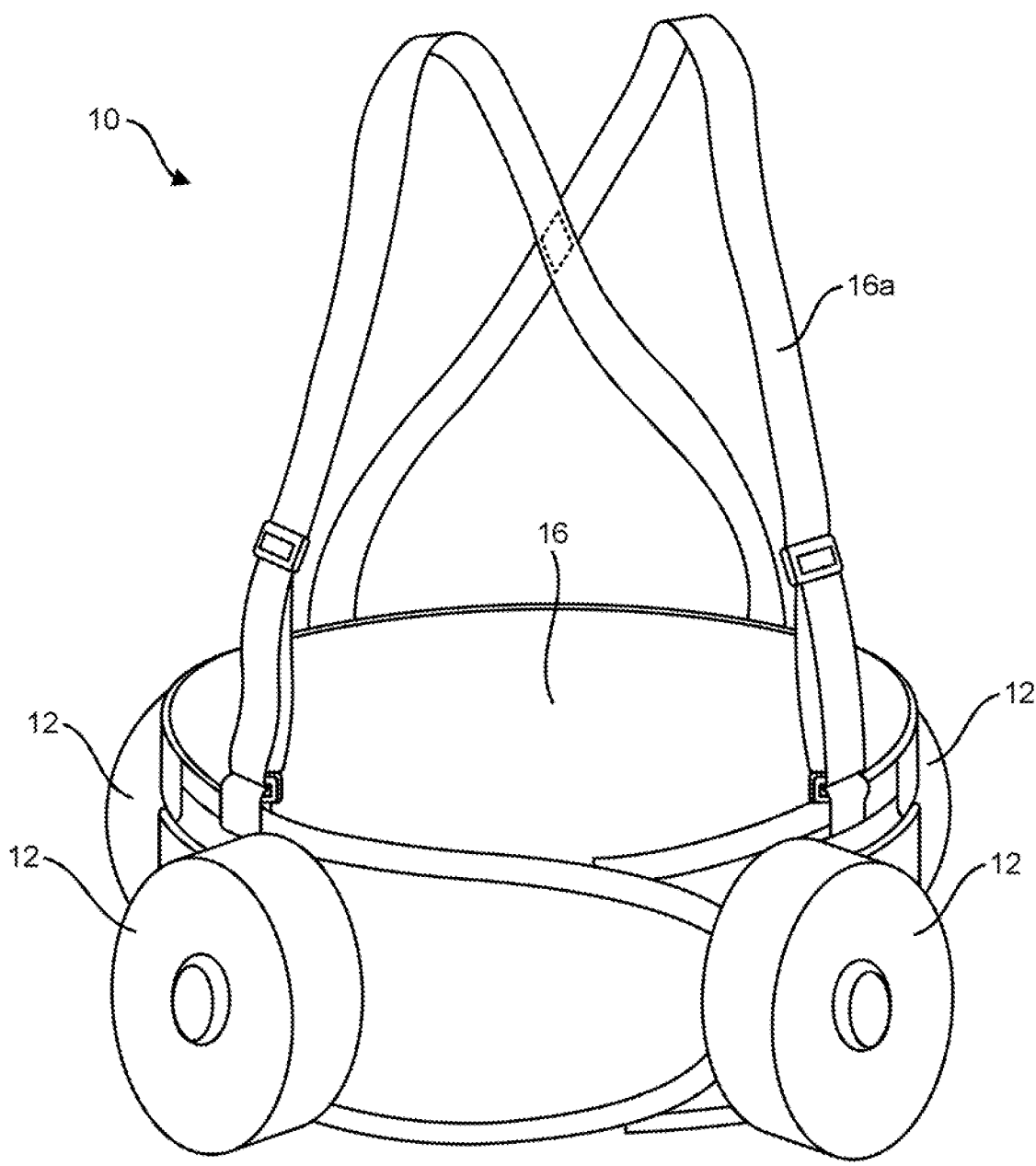
FIG. 1 shows a perspective view of the present invention.

The present invention will now be described with reference to figures representing preferred embodiments. FIG. 1 shows a perspective view of the present invention in an assembled state. As shown with reference to FIGS. 1 and 2, a stabilizing belt or harness method and apparatus 10 includes stabilizer nodes 12, a control and power node 14, a belt or harness 16 with removable straps 16a and hardware 18a that attaches the nodes to the belt or harness and 18b that covers access penetrations to adjust the centering of their internal gyroscope drive rotor. By way of example, hardware 18a,b may be screws, bolts, adhesives, or any suitable method. As shown with reference further to FIGS. 5-7, each of the stabilizer nodes contain at least one gyroscope drive rotor top section 20 and bottom section 22 that when assembled lock a plurality of permanent magnets 24 into place. The magnets purpose is two-fold: they cause rotation of the gyroscope rotor when acted upon by a stator's electromagnetic fields and amplify gyroscopic effect due to their mass and perimeter location. To limit rotational torque, each stabilizer can be paired with a second stabilizer whose rotor rotates in the opposite direction.

Figure 5:
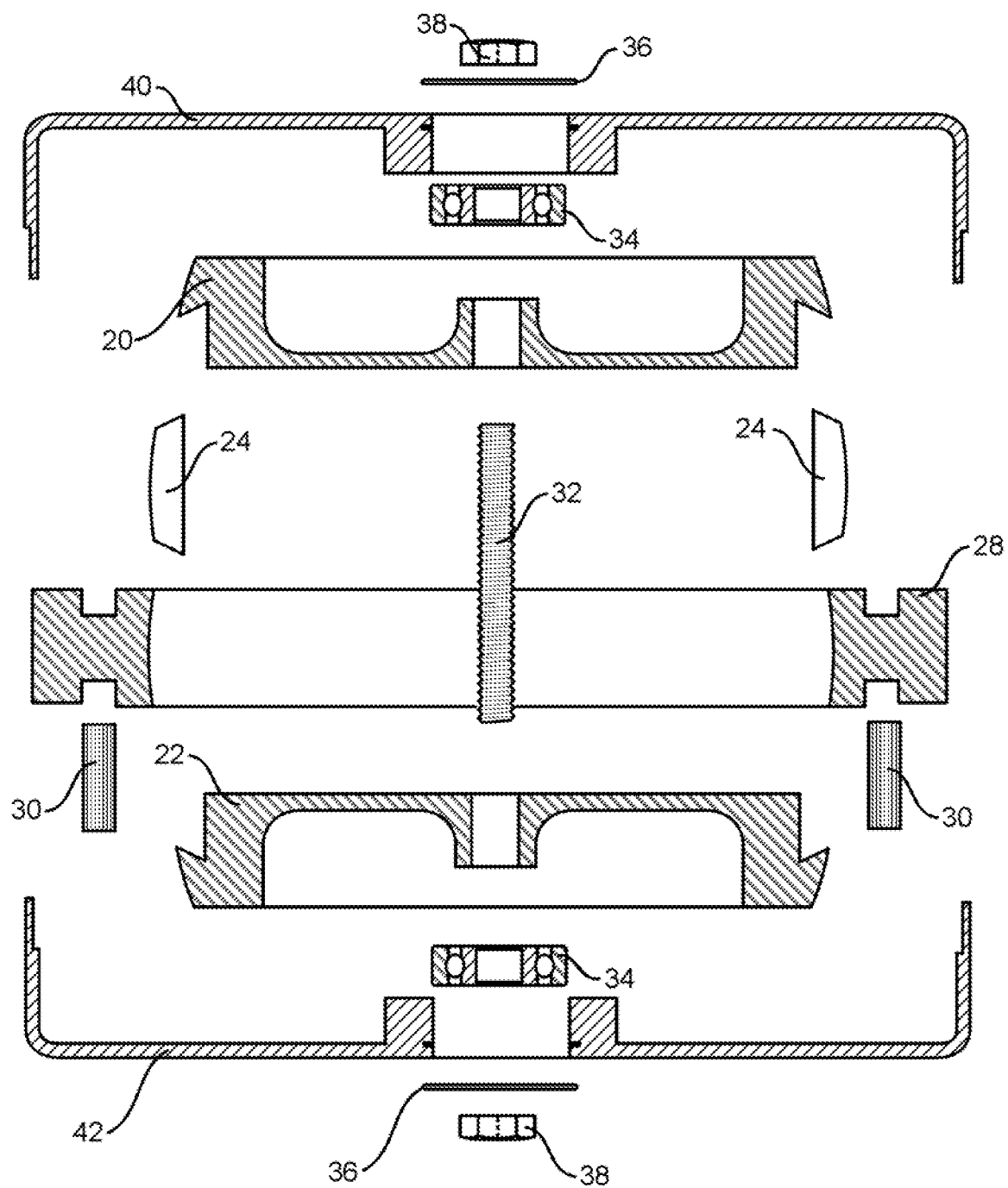
FIG. 5 is an exploded view of a stabilizer node.
Figure 6:
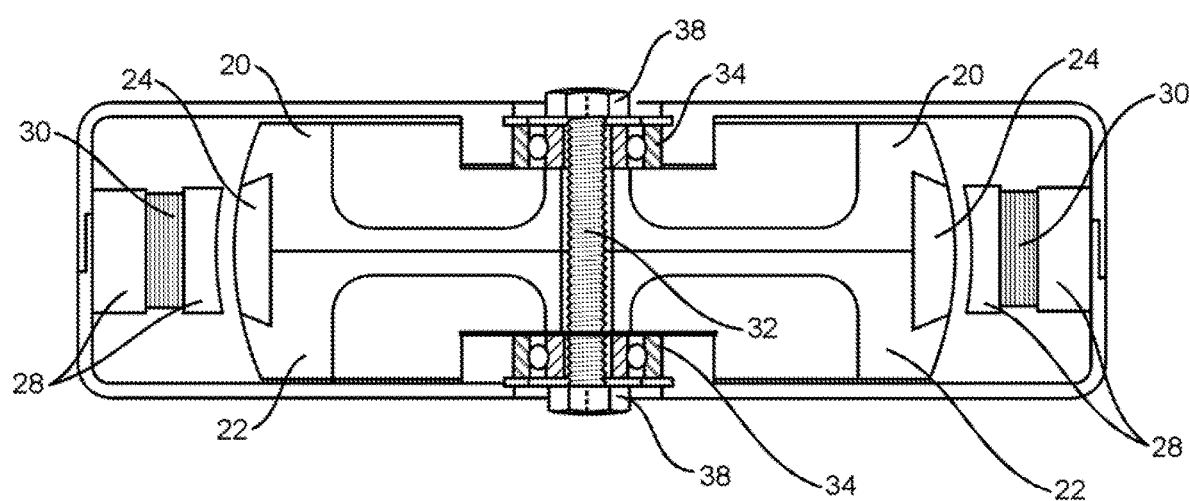
FIG. 6 presents a cross section view of a stabilizer node.
Figure 7:
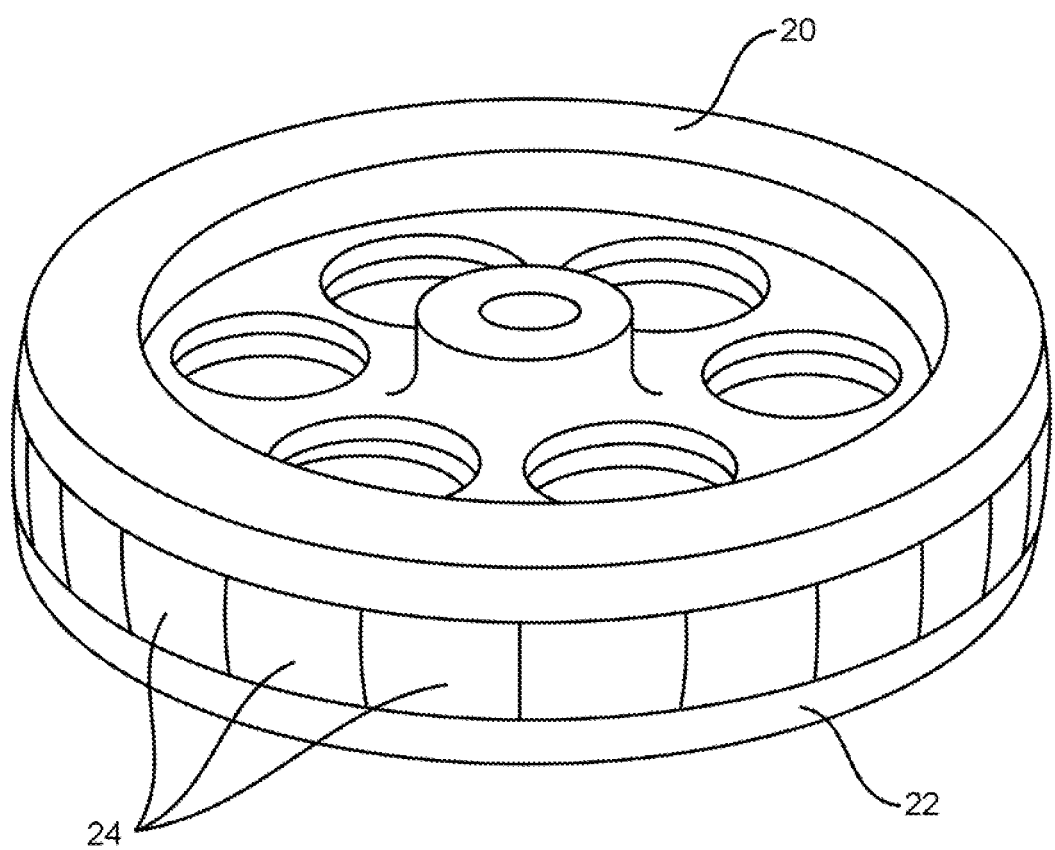
FIG. 7 shows a perspective view of a gyroscopic drive rotor
Figure 8:
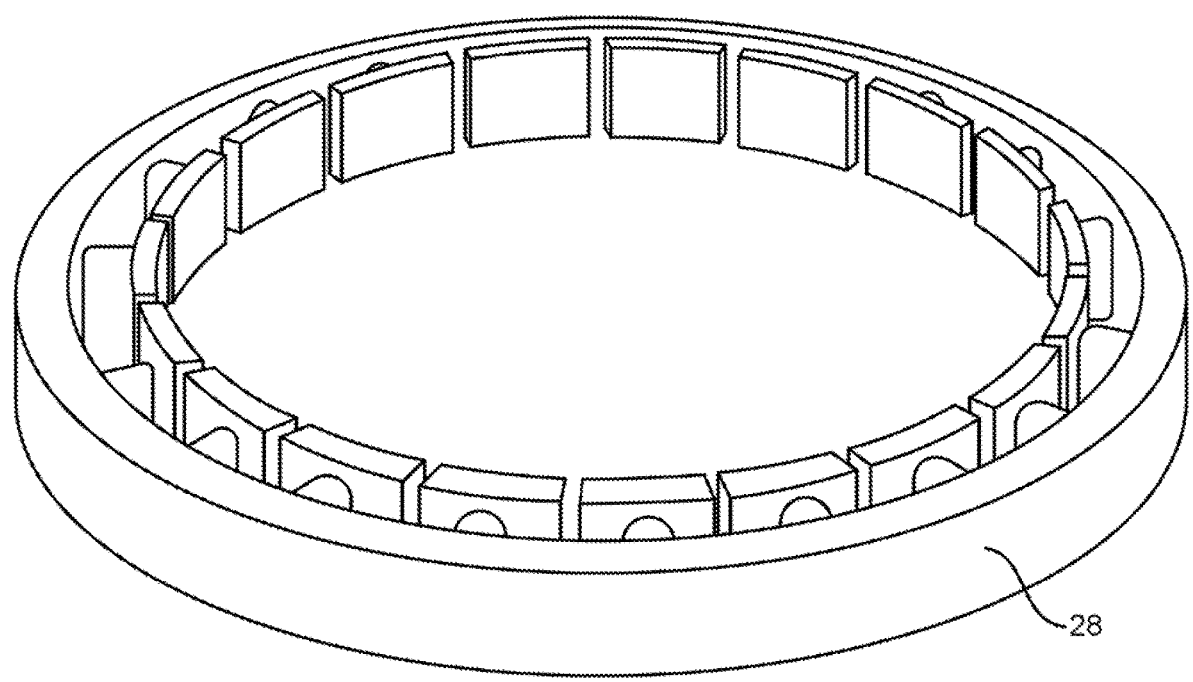
FIG. 8 shows a preservative view of a gyroscope drive stator.

As shown further with reference to FIGS. 5-6, a gyroscope stator 28, which may be made of iron laminations, ferrous composite or any suitable material, locates a plurality of field coils 30, which may be made of copper, aluminum or any suitable material, and when energized through a motor controller will create a phasing magnetic field that acts upon the magnets of the gyroscope's rotor.

Figure 4:
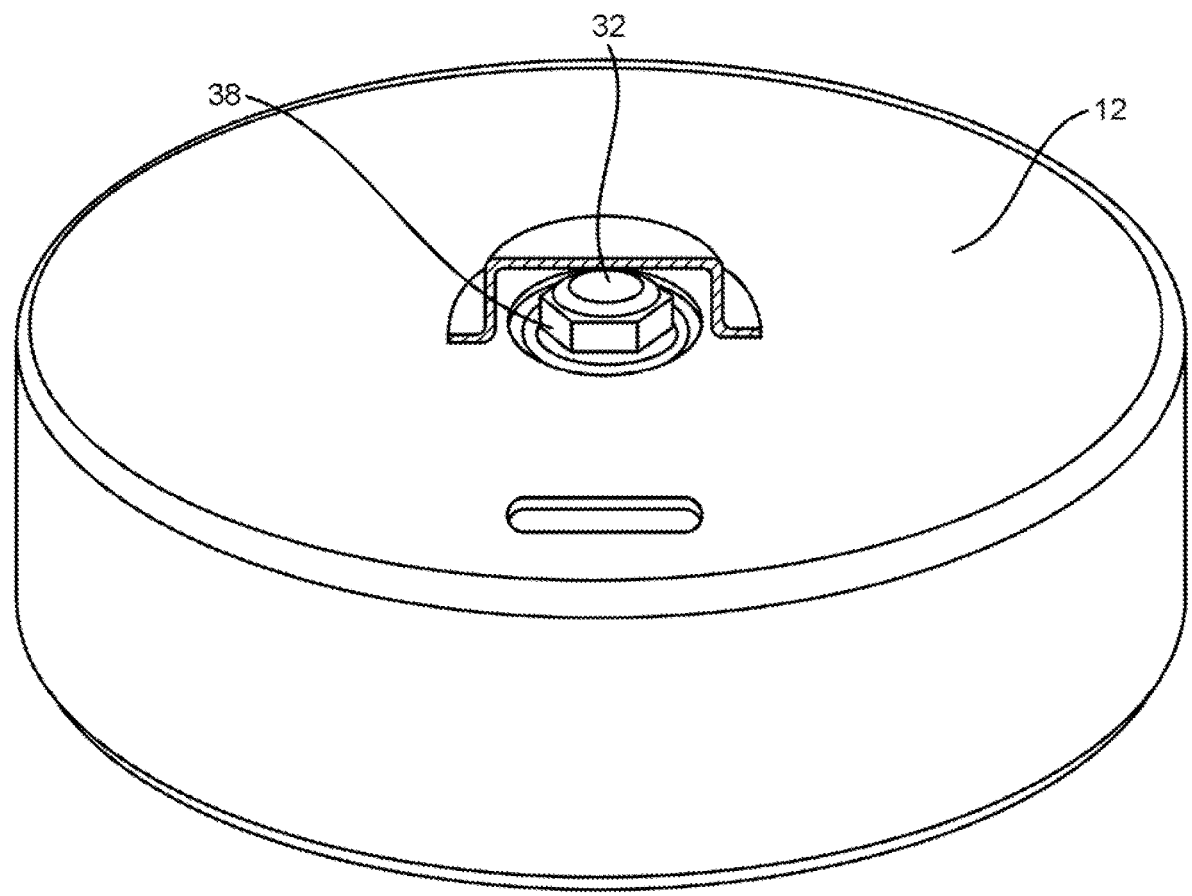
FIG. 4 shows a perspective view of a stabilizer node with axle cover cross-section.

As shown further with reference to FIGS. 4-6, central axle 32 locates the gyroscope drive rotor between a plurality of roller bearings 34 that are locked into place by a plurality of retaining bolts 38. The gyroscopic rotor assembly is centered between housing top 40 and housing bottom 42, which may be made of carbon fiber composite, aluminum, or any suitable material, by a plurality of circlips 36.

Although the invention is designed to be worn by the user, it can also be configured to stabilize walkers, canes, crutches, or anything that is used to help support the user. Additional non-human uses can include larger versions that stabilize cars and trucks from tipping over, personal air vehicles to maintain stability, boats both powered and unpowered such as sailboats, and static structures to help minimize twisting in large winds, earthquakes and any other influences that could affect the movement of the structure. It could further be used on animals in a variety of settings, including for assisting in pet movement to transportation or treatment of wild and show animals.

Figure 10:
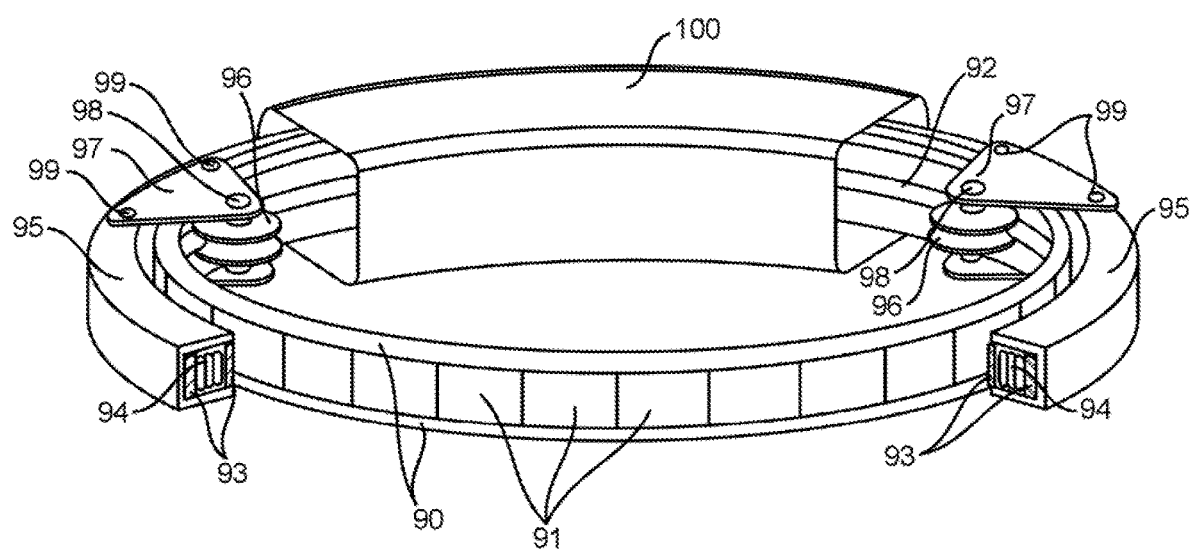
FIG. 10 shows a prospective cross-section view of a hubless stabilizer node.

In an alternate embodiment, as shown further with reference to FIG. 10, stabilizer node 12 can be configured as a hubless design with a stator that is supported along its inner bearing intersection support 92.

Figure 3:
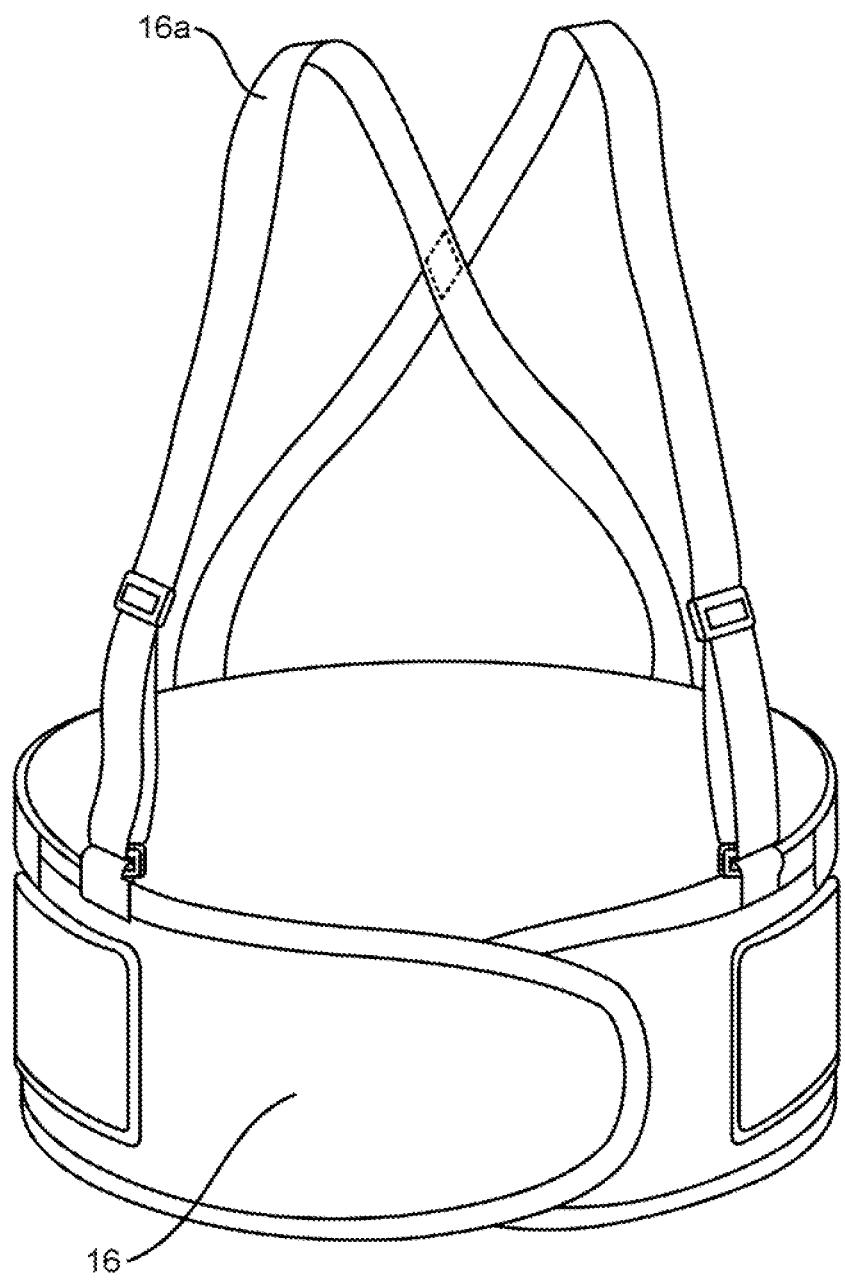
FIG. 3 shows a belt or harness with removable straps.
Figure 9:
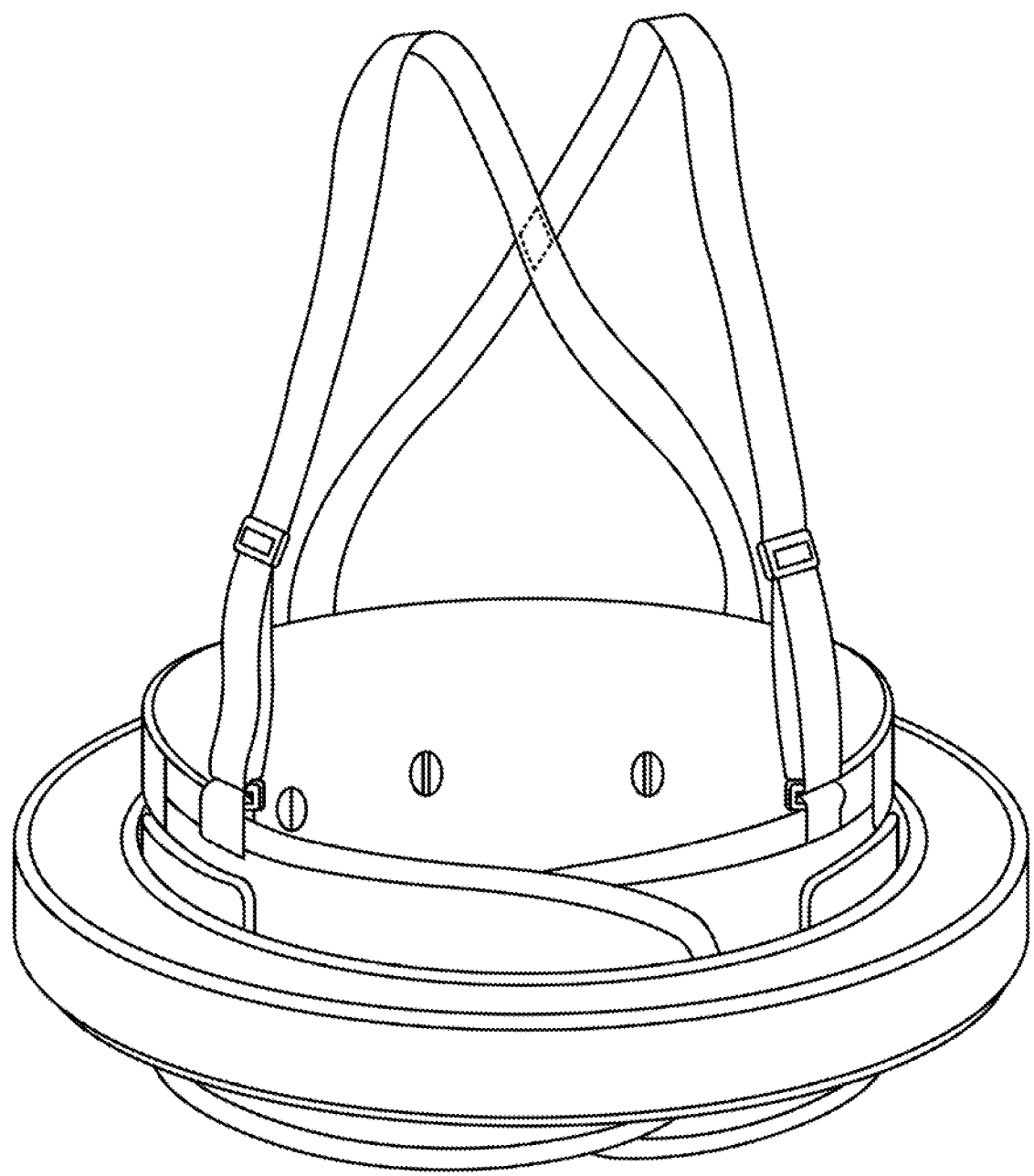
FIG. 9 presents an alternate embodiment prospective view of a hubless stabilizer node and belt or harness.
Figure 11:
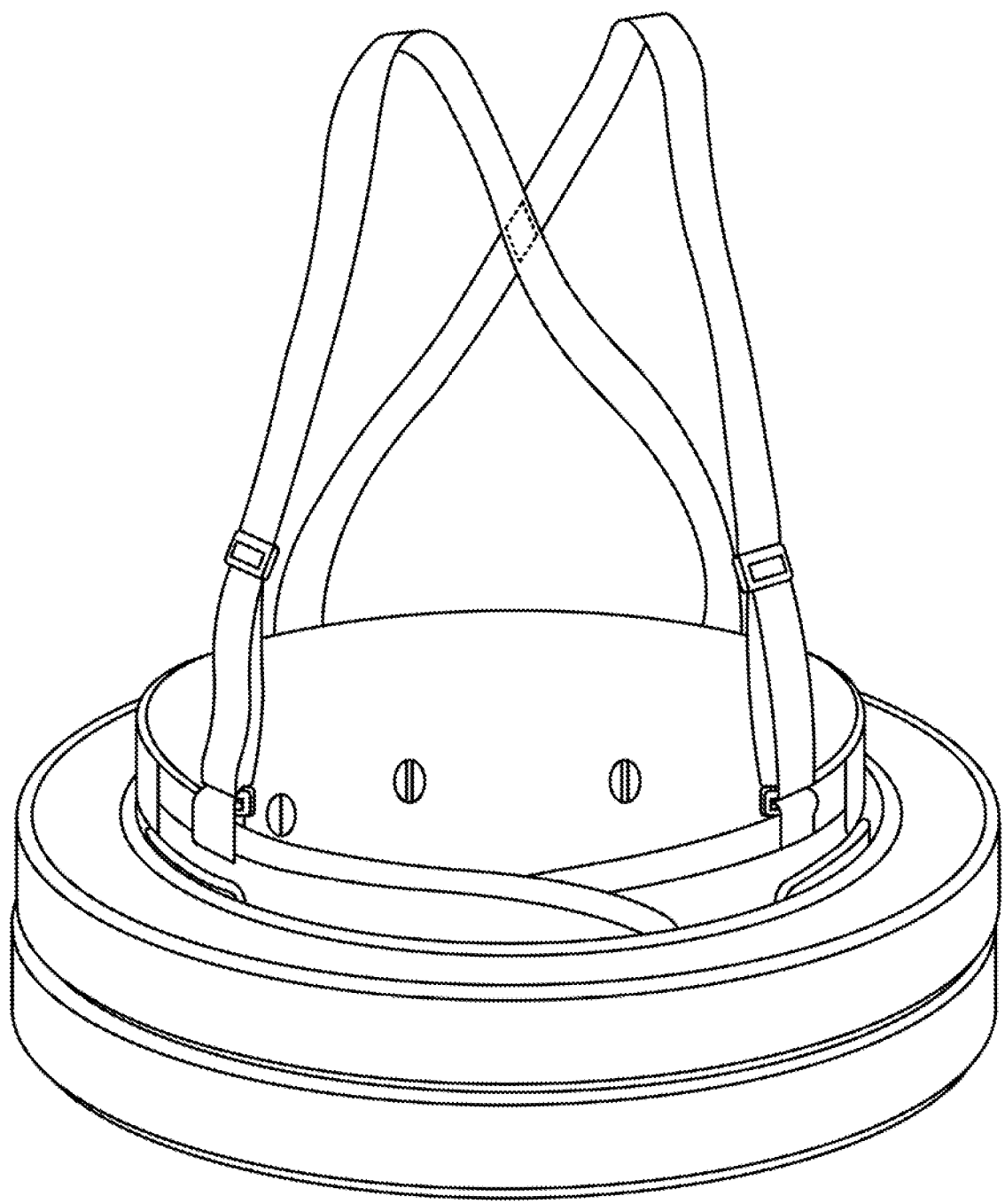
FIG. 11 presents the assembled hubless stabilizer node with two nodes that can counter rotate to eliminate rotational torque.

In an alternate embodiment shown further with reference to FIG. 9, the stabilizer node has a hubless gyroscope drive rotor allowing for a design with a central penetration that is large enough to surround the waist of the user and can be connected to a belt or harness/harness (such as shown in FIG. 3). As shown further with reference to FIG. 10, the hubless stabilizer node is composed of at least one gyroscopic drive rotor 90 with a plurality of integrated magnets 91 located in its perimeter. Integrated into the inner surface of the rotor is the bearing support surface 92. The stator may be made of aluminum, composite or any suitable material. Surrounding the rotor is stator 93 with field coils 94. A rotor shell 95, which may be made of a strong lightweight composite, aluminum or any suitable material, locates framework 97 that supports a plurality of roller bearings 96 mounted on a plurality of axles 98. Hardware 99, which may utilize screws, adhesives, or any suitable method is used to attach the framework to the rotor shell. Enveloping the device is an outer shell 100, composed of carbon fiber composites, aluminum, or any suitable material. In an alternative embodiment, as shown further with reference to FIG. 11, rotational torque created by the device can be diminished by employing a second counter rotating hubless gyroscope node placed one above the other or using a double-sided stator that spins two hubless rotors in opposite directions (not shown).

The counter rotating versions of the medical stabilizer belt or harness can be applied to not only human usage but also can be configured to stabilize walkers, canes, crutches, or anything that is used to help support the user. Additional non-human uses can include larger versions that stabilize cars and trucks from tipping over, personal air vehicles to maintain stability, boats both powered and unpowered such as sailboats, yachts, and static structures to help minimize twisting in large winds, earthquakes and any other influences that could affect the movement of the structure. It could further be used on animals in a variety of settings, including for assisting in pet movement to transportation or treatment of wild and show animals.

Figure 2:
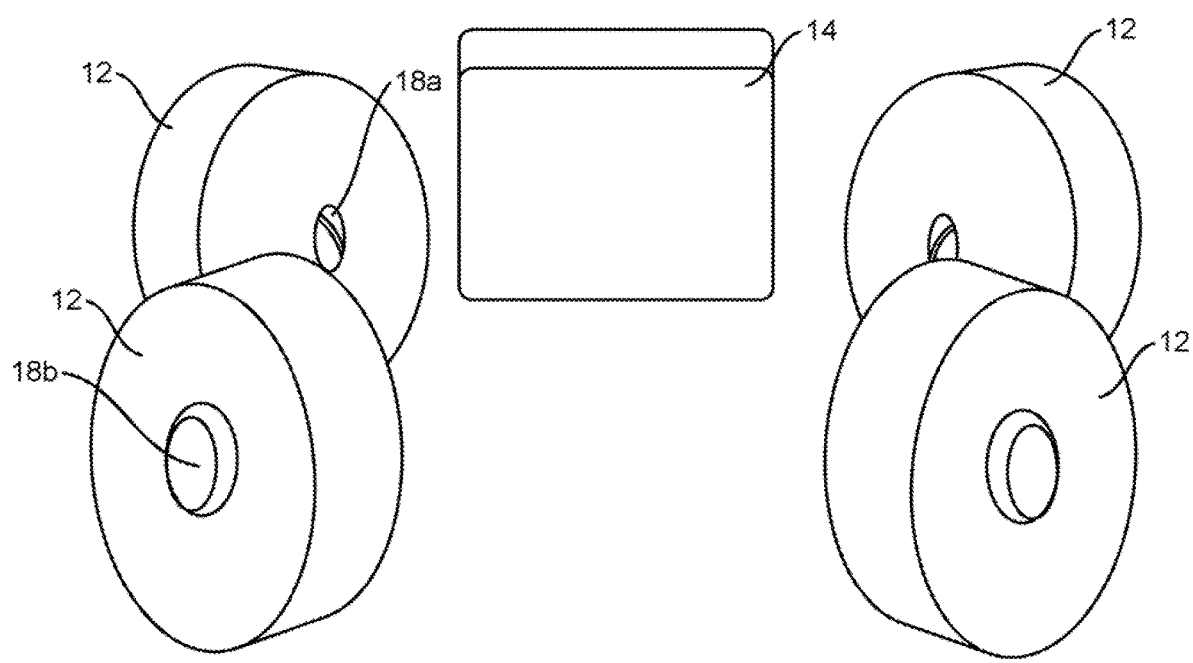
FIG. 2 shows the invention components without a belt or harness.
Figure 12:
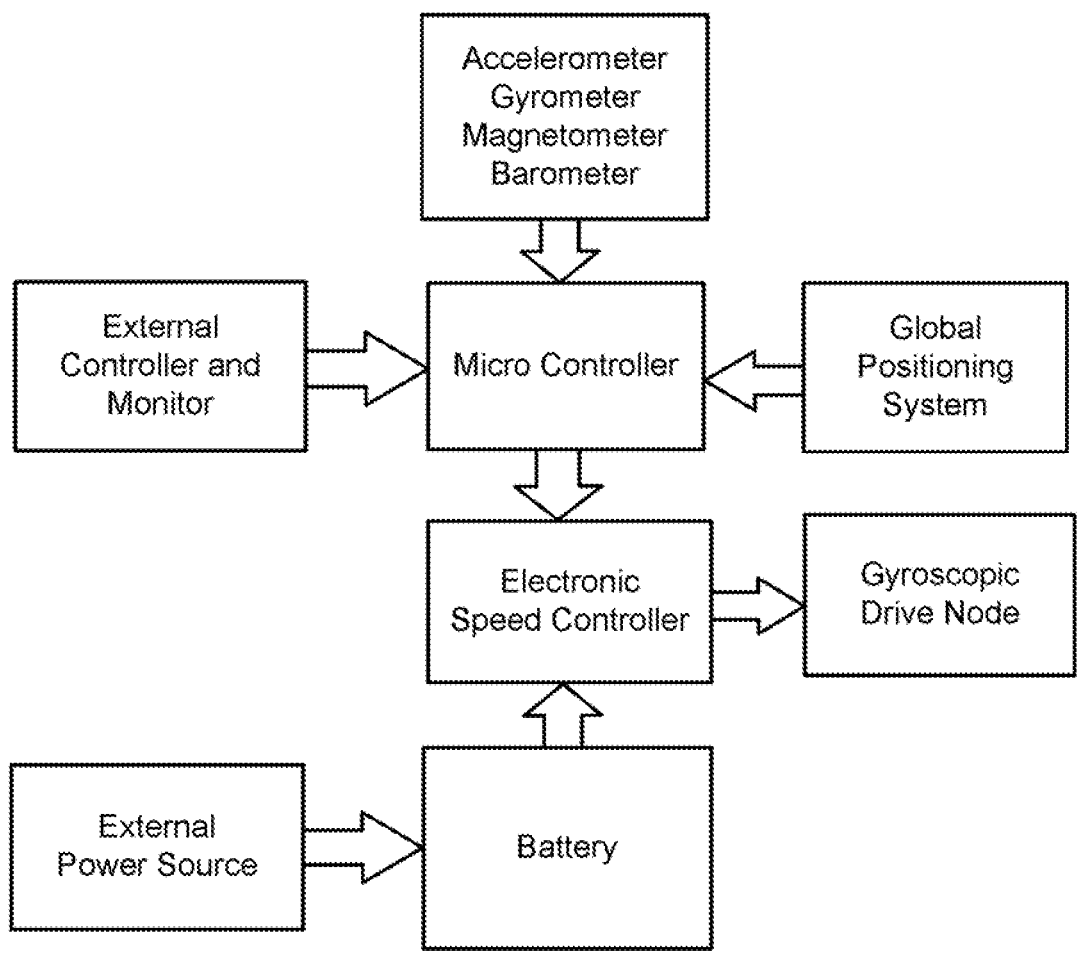
FIG. 12 shows a schematic of a controller node.

As shown further with reference to FIG. 2, a controller 14 contains electronics that may be used to monitor the user's motions and contains a battery source. The controller can be set to be on all the time or directed by its electronics. As shown further with reference to FIG. 12, the controller preferably includes motion sensing components, motor controller, battery source and available inputs for external control by a therapist and an external power source if available. The external power source can also be used to recharge the battery source.

In an alternate embodiment, the device is used to assist in physical therapy and is either turned either on or off manually assisting the user with balance and typically powered externally for longer sessions.

While the preferred embodiment of the invention is meant to be worn around the waist, appropriate sized versions can be worn on any part of the body when applicable, for example in physical therapy of an appendage. The stabilizer may be electrically powered and sized to create enough artificial balance to meet the needs for the required results. Multiple units can be stacked to increase the artificial balance while keeping the overall diameter to a minimum. Multiple units may be employed by the user at various locations (e.g. one on each arm, one of each leg, one around the waist). In alternative embodiments, multiple stabilizers may be integrated into various regions of the clothing to meet the desired results. For example, proximate to the arms legs, center section or anywhere additional balance is desired.

In yet alternative embodiments, stabilizers can be utilized to restrict the movements of structures to minimize damage due to outside influence, e.g. a skyscraper swaying due to wind is diminished by the stabilizer. A moving vehicle such as a boat, car, or airplane can integrate the stabilizer to add additional stability. The invention may be used in physical therapy to add balance or resistance without the need for extraneous structures such as physical therapy parallel bars. The invention may be used in sports to train athlete's by adding additional balance, e.g., riding a skateboard, surf board, horse or bicycle. The invention provides artificial balance for the physically impaired, e.g., elderly to limit slip and fall accidents. The invention may also monitor the user and be activated when signaled that a fall might take place. The invention may be operated in an always on or always off mode.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A method for wearable user stabilization, comprising: securely coupling a stabilizer apparatus to a user with a harness, the stabilizer apparatus comprising:
    at least one hubless motor configured to create a first gyroscopic force having rotational torque; and
    at least one counter rotating hubless motor configured to create a second gyroscopic force to diminish rotational torque of the first gyroscopic force;
 creating at the stabilizer apparatus a first gyroscopic force using the at least one hubless motor;
 creating at the stabilizer apparatus a second gyroscopic force using the at least one counter rotating hubless motor to diminish rotational torque of the first gyroscopic force; and
 transferring inertia to the user from the apparatus to the harness to create artificial balance for the user.

2. The method for wearable user stabilization of claim 1, wherein the stabilizer apparatus is configured to be harnessed to at least one of the user's waist, arms or legs.

3. The method for wearable user stabilization of claim 1, wherein the stabilizer apparatus is configurable by at least one of size or shape to adapt to location requirements on the user where the stabilizer apparatus is harnessed.

4. The method for wearable user stabilization of claim 1, wherein the stabilizer apparatus is configurable to be integrated into clothing of the user.

* * * * *